(12) United States Patent
Collins et al.

(10) Patent No.: US 11,111,420 B2
(45) Date of Patent: Sep. 7, 2021

(54) WATERBORNE BONDING ADHESIVE FORMULATION FOR SHEET MEMBRANE INCORPORATING A SOLID PLASTICIZER

(71) Applicant: Illinois Tool Works Inc., Glenview, IL (US)

(72) Inventors: Patrick Collins, Boston, MA (US); Michael N. Atwater, Salem, NH (US); Frederick P. Walnut, N. Attleborough, MA (US); Keith D. Begin, Whitman, MA (US); Todd Pankey, Winnetka, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 158 days.

(21) Appl. No.: 16/261,135

(22) Filed: Jan. 29, 2019

(65) Prior Publication Data
US 2019/0233684 A1    Aug. 1, 2019

Related U.S. Application Data

(60) Provisional application No. 62/623,678, filed on Jan. 30, 2018.

(51) Int. Cl.
| | |
|---|---|
| *C09J 123/08* | (2006.01) |
| *C09J 5/00* | (2006.01) |
| *C09J 175/04* | (2006.01) |
| *C09J 131/04* | (2006.01) |
| *C08G 18/08* | (2006.01) |
| *C08K 5/17* | (2006.01) |
| *C08K 5/06* | (2006.01) |
| *C08K 5/151* | (2006.01) |

(52) U.S. Cl.
CPC .... *C09J 123/0853* (2013.01); *C08G 18/0819* (2013.01); *C08G 18/0823* (2013.01); *C08G 18/0828* (2013.01); *C09J 5/00* (2013.01); *C09J 131/04* (2013.01); *C09J 175/04* (2013.01); *B32B 2419/06* (2013.01); *C08K 5/06* (2013.01); *C08K 5/151* (2013.01); *C08K 5/17* (2013.01); *C08L 2205/03* (2013.01); *C08L 2205/035* (2013.01); *C09J 2301/414* (2020.08); *C09J 2423/04* (2013.01); *C09J 2431/00* (2013.01); *C09J 2475/00* (2013.01)

(58) Field of Classification Search
CPC ............. B32B 2419/06; C09J 123/0853; C09J 2431/00; C09J 175/04; C09J 2475/00
See application file for complete search history.

(56) References Cited

U.S. PATENT DOCUMENTS

| | | | | |
|---|---|---|---|---|
| 4,618,390 | A * | 10/1986 | Powell | C08G 18/302 156/307.3 |
| 5,837,089 | A * | 11/1998 | Magrum | B32B 37/1207 156/275.5 |
| 2007/0130864 | A1 * | 6/2007 | Semmens | E04D 11/02 52/408 |
| 2011/0104501 | A1 * | 5/2011 | Watson | C09D 15/00 428/425.1 |
| 2013/0206630 | A1 * | 8/2013 | Burmeister | C09J 9/00 206/459.1 |

* cited by examiner

*Primary Examiner* — Philip C Tucker
*Assistant Examiner* — Jimmy R Smith, Jr.
(74) *Attorney, Agent, or Firm* — Blue Filament Law PLLC

(57) ABSTRACT

An adhesive formulation is provided that is a waterborne bonding adhesive for adhering sheet membranes that may incorporate a solid plasticizer. The formulation is fast-curing and develops bond strength rapidly after application to a substrate as the adhesive dries, when the sheet membrane is mated to the substrate. The fast-curing characteristic is important to ensure the membrane is not displaced from the surface in windy exterior applications. The adhesive is formulated to form the bond between sheet membranes to substrates that illustratively include, steel, wood, concrete, roof boards, insulation, and fiberglass mat roof boards.

4 Claims, No Drawings

WATERBORNE BONDING ADHESIVE FORMULATION FOR SHEET MEMBRANE INCORPORATING A SOLID PLASTICIZER

CROSS REFERENCE TO RELATED APPLICATIONS

This application claims priority benefit of U.S. Provisional Application Ser. No. 62/623,678 filed 30 Jan. 2018; the contents of which are hereby incorporated by reference.

FIELD OF THE INVENTION

The present invention in general relates to an adhesive formulation and in particular to such formulations that are waterborne (water-based) bonding adhesives for adhering sheet membranes that incorporate a solid plasticizer.

BACKGROUND OF THE INVENTION

Structural adhesives are well-known for bonding sheet membranes to substrates including combinations of sheet membranes to substrates such as steel, wood, concrete, roof boards, insulation, and fiberglass mat roof boards. Structural adhesives have met with considerable success due to the ease of application and even distribution of bonding forces compared to rivets or fusion bonds. Additionally, structural adhesives can form a barrier against external environmental interactions such as water and dust, thereby protecting a structures interior.

For most of the attractive aspects of structural adhesives as to high temperature performance and good durability, the rigidity of the resulting structural bond creates several problems for certain applications. Common problems associated with bond rigidity including uneven stress. Furthermore, for outdoor applications it is important that the membrane not be blown off the surface substrate it is being bonded to.

Many of the existing problems of structural adhesives would be overcome if an adhesive existed that will develop bond strength immediately after application as the adhesive dries, when a membrane containing a solid plasticizer is mated to a substrate, while maintaining the attractive aspects of structural adhesives. Thus, there exists a need for such a structural adhesive with superior properties as compared to conventional products.

SUMMARY OF THE INVENTION

An adhesive composition is provided that includes multiple polymers and resins, including a polyurethane dispersion. The adhesive is a waterborne (water-based) for adhering sheet membranes that incorporate a solid plasticizer, including, but not limited to, ketone ethylene ester (KEE) resin. The adhesive is formulated to form a bond between sheet membranes to substrates that include, but are not limited to, steel, wood, concrete, roof boards, insulation, and fiberglass mat roof boards. The adhesive formulation includes a polyurethane dispersion (PUD), (vinyl acetate/ethylene) copolymer (VAE), an alkanolamine, a tackifying resin, an ether, and water such that the formulation has a pH of from 7.0 to 10.5.

A method of bonding a sheet membrane to a substrate is provided that includes the application of the adhesive formulation to a substrate by a roller, brush, or spray. The sheet membrane and the substrate are brought into simultaneous contact with the adhesive formulation to bond the sheet membrane to the substrate upon adhesive cure.

DETAILED DESCRIPTION OF THE PREFERRED EMBODIMENTS

A waterborne (water-based) bonding adhesive for adhering sheet membranes that incorporate a solid plasticizer is provided that is fast-curing and develops bond strength immediately after application to a substrate as the adhesive dries, when the sheet membrane containing a solid plasticizer is mated to the substrate. The fast-curing characteristic is important to ensure the membrane does not get blown off the surface it is being bonded to including substrates in exterior applications. The adhesive is formulated to form the bond between sheet membranes to substrates that include, but are not limited to, steel, wood, concrete, roof boards, insulation, and fiberglass mat roof boards. Solid plasticizers in such membranes conventionally include a ketone ethylene ester (KEE) resin marketed by E. I. du Pont de Nemours and Company as ELVALOY®. asphalt, (ethylene terpolymer, butyl-methacrylate polymers (BMA), and ethyl-methacrylate polymers (EMA).

Embodiments of the inventive waterborne bonding adhesive are composed of multiple polymers and a resin, including a polyurethane dispersion. It is appreciated that the multiple polymers may include acrylic dispersions or other related polymers, that may be used instead of the VAE (vinyl acetate/ethylene) copolymer, in conjunction with the polyurethane dispersion. In a specific inventive embodiment an aliphatic dispersion that is made from a polycarbonate-based polyol and one that has amino functionality, in addition to a dispersion made of a polyether polyurethane dispersion (PUD).

Embodiments of the adhesive formulation include a VAE and a PUD so as to bond to ELVALOY® or other solid plasticizer modified PVC, as well as regular PVC. The PUD, containing specific functional groups, promotes the necessary adhesion to the ELVALOY® modified PVC membrane, once the adhesive has dried. Without the PUD there is typically no adhesion after the adhesive has dried. It is appreciated that alternative polymers beyond the VAE in conjunction with the PUD may be substituted. An example would be an acrylic latex and related polymers illustratively including vinyl acrylics, styrene acrylics, and combinations thereof. The same is true for related VAE and VA polymer latex such as vinyl acetate/acrylic/ethylene terpolymers.

It is to be understood that in instances where a range of values are provided, for example with respect to a weight percentage range of a formulation component, that the range is intended to encompass not only the end point values of the range but also intermediate values of the range as explicitly being included within the range and varying by the last significant figure of the numeral. By way of example, a recited range of from 1 to 4 is intended to include 1-2, 1-3, 2-4, 3-4, and 1-4

In embodiments of the inventive adhesive formulation it has generally been found that adhesion is promoted with increasing PUD concentration. Optimally, at a 1:1 to a 2.5:1, VAE:PUD, the best overall bond performance has been attained. VAE:PUD at 0-0.9:1.0 may be used but cost is increased unnecessarily. The VAE has excellent plasticizer resistance, to maintain high peel strength at the lowest cost, but VAE will not have the bond development for ELVALOY® modified PVC. The PUD has excellent plasticizer resistance to maintain high peel strength at a higher cost, and can bond to ELVALOY® modified PVC. In specific inventive embodiments of the adhesive, it has been found that there is an increased peel adhesion for ELVALOY® modified PVC using the combination of a tackifying resin and a glycol ether. Either tackifying resin alone or the glycol ether alone will help adhesion, but the combination of the two items promotes a cost-effective bond performance that allows for use of lower PUD levels.

In inventive embodiments of the inventive adhesive formulation the polymers may be blended together at a specific pH range, so that they are compatible and stable over time. Preferred pH range is from 7.0 to 12.5, and ideally between 7.0-10.5.

Waterborne adhesives allow for reduced hazards in use versus solvent-based adhesives, such as lower VOCs (volatile organic compounds), reduced flammability, and a milder odor. Embodiments of the inventive waterborne bonding adhesive develop bond strength over the first 24 hours after application, and then continue to build bond strength for about 30 days after application to its ultimate bond strength.

Embodiments of the inventive waterborne bonding adhesive may be applied by roller, brush, or spray. The waterborne bonding adhesive may be applied to plain-backed membranes, as well as fleece-backed membranes. In a specific embodiment the waterborne bonding adhesive may be applied to only one side of the membrane substrate assembly, then the substrates can be mated together and bonded immediately when applied in a "wet lay-in" method. In a specific embodiment the waterborne bonding adhesive may be applied to both sides of the membrane substrate assembly, allowed to mostly dry to the touch, then the substrates may be mated together to bond. In a specific embodiment the waterborne bonding adhesive can be used with liquid plasticized sheet membranes.

In some inventive embodiments, an adhesive is provided that builds strength as the aqueous solvent evaporates thereby facilitating adhesion of sheet membranes to exterior substrates during construction and under high wind conditions.

An adhesive formulation has the attributes of adhesion to a variety of substrates and builds strength over the 24 hours and continues to strengthen for approximately 30 days. The inventive adhesive formulation includes a polyurethane dispersion resin present at greater than or equal to 0 to 100 total weight percent.

Polyurethane polymers operative herein include polyether polyurethanes, polyurethane ionomers having ionic groups such as anionomers and cationomers. Functional groups on the PUD known to promote bonding illustratively include amino groups. It is known that amino based adhesion promoters act to increase adhesion, but that there are many negative effects associated with the use of amino based promotors including discoloration of the adhesive, instability at higher pH with decreased adhesion at lower pH, and high cost. Examples of such ionomers include anionomers that are produced by reacting organic diisocyanates having molecular weights of from about 160 to about 300 with alkylene polyols such as ethylene glycol, and optionally other aliphatic glycols having molecular weights of from 62 to about 400 in the presence of glycols containing carboxyl, carboxylate, sulfonic acid and/or sulfonate groups and having a number average molecular weight of less than around 500. These polyurethane polymers containing the ionic groups of hydrophilic polyether segments are self-emulsifiable. Other polyurethanes include cationic polyurethanes that are formed by quaternizing polyaddition reactions. Such polyurethanes are self-dispersing in water. These are commercially available as a milky-white resin with typically between 10 and 60 percent solids and a flash point that is greater than 100° C. Typical particle size is from 0.2 to 28 microns in the inventive adhesive formulation. Typical viscosities of this dispersion are from 10 to 1000 centipoise. Exemplary polyurethanes operative herein illustratively include those detailed in EP 0709414B1

An alkanolamine is present in an inventive formulation and includes primary, secondary and tertiary amines of the formula:

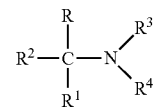

where R and $R^1$ are each independently hydrogen, methyl, or hydroxymethyl; $R^2$ is methyl, ethyl or hydroxymethyl; and $R^3$ and $R^4$ are each independently hydrogen, methyl, or ethyl. Specific alkanolamines operative herein illustratively include: 2-amino-2-methyl-1-propanol (AMP); 2-amino-1-butanol; 2-amino-2-methyl-1,3-propanediol; 2-amino-2-ethyl-1,3-propanediol; 2-amino-2-hydroxymethyl-1,3-propanediol, and combinations thereof. Typical amounts of alkanolamine in an inventive formulation range from 0.01-3.0 total weight percent.

A tackifying agent is present in an inventive formulation and includes a solid tackifying resin or a blend of solid tackifying resin and liquid resin, or a blend of solid tackifying resin and liquid plasticizer and/or liquid tackifying resin. The solid or liquid tackifying resins operative herein illustratively include aliphatic hydrocarbon resins made from the polymerization of monomers including ethylenically unsaturated $C_4$-$C_8$ molecules; rosin esters and rosin acids; mixed aliphatic/aromatic tackifying resins; polyterpenes; and hydrogenated tackifying resins. The hydrogenated resins also include resins formed from the polymerization and subsequent hydrogenation of a feedstock based on dicyclopentadiene; resins produced from the polymerization and subsequent hydrogenation of pure aromatic feedstocks such as styrene, alpha-methylstyrene, vinyl toluene; resins formed from the polymerization and subsequent hydrogenation of $C_7$-$C_{12}$ aromatics; and resins produced from the polymerization and subsequent hydrogenation of aliphatic petroleum derivatives of $C_4$-$C_{10}$ dienes and monoolefins, such as piperylene, isoprene and 2-methyl-2-butene. Typical amounts of tackifying agent in an inventive formulation range from 3 to 15 total weight percent. Liquid plasticizers suitable for use in an inventive formulation illustratively include naphthenic oils and paraffinic oils.

An ether is present in an inventive formulation. Specific ethers operative herein illustratively include: cyclic ethers such as tetrahydrofuran, tetrahydropyran and 1,4-dioxane; aliphatic monoethers such as diethyl ether and dibutyl ether; aliphatic polyethers including e-series and p-series glycol ethers such as ethyleneglycoldimethyl ether, ethyleneglycoldiethyl ether, ethyleneglycoldibutyl ether, diethyleneglycoldiethyl ether and diethyleneglycoldibutyl ether; aromatic ethers such as diphenyl ether and anisole, and combinations thereof. Typical amounts of ether in an inventive formulation range from 1-10 total weight percent.

A thickener is present in some embodiments of an inventive formulation. Specific thickeners operative herein illustratively include: non-ionic polyurethanes; polyacrylate based polymers such as polyacrylate polymers based on a majority by monomer number percentage of acrylic acid, acrylic acid esters, vinyl acetate, methacrylic acid, acrylonitrile and mixtures thereof; hydroxyl ethyl celluloses such as hydrophobically modified hydroxyl ethyl cellulose; xanthan gum; hydrogenated castor oil (HCO) and mixtures thereof. Typical amounts of the optional thickener in an inventive formulation range from 0-2.0 total weight percent.

A thixotrope is present in some embodiments of an inventive formulation. Specific thixotropes operative herein illustratively include: pyrogenic or fumed silica, gelling grade clays such as bentonite, hectorite, attapulgite, montmorillonite, or sepiolite, alone or in combination with polyols, or chemically modified with a surfactant, either cationic or nonionic, so as to form "onium-clays", or by adsorbing surfactant on the clay particles. Typical amounts of the optional thixotrope in an inventive formulation range from 0-2.0 total weight percent.

A filler is present in some embodiments of an inventive formulation. Specific fillers operative herein illustratively include: kaolin clay, or calcium carbonate. Typical amounts of the optional filler in an inventive formulation range from 0-10 total weight percent.

A plasticizer is present in some embodiments of an inventive formulation. Specific plasticizers operative herein illustratively include: phthalate esters such as dibutyl phthalate (DBP) and dioctyl phthalate (DOP), and further include various phenols, such as α-methylbenzyl toluene, α-,α'-dimethylbenzyl toluene, α-methylbenzyl xylene, α-,α'-dimethylbenzyl xylene, bis-(α-methylbenzyl) toluene, bis-(α-methylbenzyl) xylene, bis-(α,α'-dimethylbenzyl toluene, bis-(α,α'-dimethylbenzyl) xylene, α-methylbenzyl-α-methyl (dimethyl) benzyl-benzene, 1-phenyl-1-xylyl-3-phenylbutane, and 1,3,5-triphenylhexane. or combinations thereof. Alternative non-phthalate plasticizers may be used. Typical amounts of the optional plasticizer in an inventive formulation range from 0-5 total weight percent.

A surfactant is present in some embodiments of an inventive formulation. Specific surfactants operative herein are nonionic and illustratively include: octylphenol polyethoxylate (mean degree of ethoxylation: 10), polyoxyethylene lauryl ether, those detail in U.S. Patent Publication 2007/0003998, paragraph [0035], and combinations thereof, Typical amounts of the optional surfactant in an inventive formulation range from 0-3 total weight percent.

A water miscible alcohol is present in some embodiments of an inventive formulation. Specific water miscible alcohol operative herein are methanol, ethanol, the propanols, the butanols, and combinations thereof, regardless of the degree of branching. Typical amounts of the optional alcohol in an inventive formulation range from 0-5 total weight percent.

In some inventive embodiments, one or more additives are provided to enhance the performance of the resulting adhesive or storage properties of the adhesive formulation. Such additive(s) may function as cure inhibitors, open-time promoters, wetting agents, pH control, preservatives, antioxidants, dyes, pigments, and reinforcing agents.

The formulary of an inventive adhesive formulation is summarized below in Table 1.

TABLE 1

Summary of Unfilled Inventive Adhesive Formulation

| Component | Typical Amount Total Wt. Percent | Pref. Amount Total Wt. Percent |
|---|---|---|
| PUD | 20-90 | 18-32 |
| VAE | 20-90 | remainder |

TABLE 1-continued

Summary of Unfilled Inventive Adhesive Formulation

| Component | Typical Amount Total Wt. Percent | Pref. Amount Total Wt. Percent |
|---|---|---|
| Alkanolamine | 0.01-3.0 | 0.5-0.9 |
| Tackifying agent | 3-15 | 5-11 |
| Ether (e.g. glycol ether) | 1-10 | 2-7 |
| Water | 0.1-10 | 2-4 |
| Thickener | 0-2.0 | 0.2-0.8 |
| Thixotrope | 0-2.0 | 0.3-0.6 |
| Filler | 0-10 | 3-7 |
| Plasticizer | 0-5 | 0.6-1.2 |
| Surfactant | 0-3 | 0.6-1.4 |
| Water miscible alcohol | 0-5 | 2-4 |

EXAMPLES

The present invention is further detailed with respect to the following non-limiting examples. These examples are intended to be illustrative of particular formulations and properties of the inventive adhesive, and not intended to limit the scope of the appended claims.

Example 1

Formulating and Mixing Procedure of Inventive Formulation

An inventive formulation is created as follows:
1. While mixing charge water, alkanolamine, glycol ether, lower alcohol, and plasticizer.
2. Admix VAE latex
3. Admix preservative, defoamer, surfactants (if any)
4. Admix clay until fully dispersed (if any)
5. Admix mineral based thixotrope and fully disperse
6. Admix polymeric thickener until smooth and initial viscosity is above 7,500 cPs Example 2

Comparison with Conventional Products

The tables below illustrate comparisons with embodiments of the inventive formulation and existing products.

Table 2 illustrates peel strength for an embodiment of the inventive adhesive formulation and an existing adhesive formulation for inventive modified PVC and PVC.

TABLE 2

Peel Adhesion Testing for inventive modified PVC and PVC (regular)

| Membrane | Condition (days/temp. °C.) | Inventive formulation Peel Force (pli) | Conventional Comparative Product-Waterbased adhesive Peel Force (pli) |
|---|---|---|---|
| Solid Plasticizer Modified PVC | 1 D Room Temp (RT = 20° C.) | 7.59 | 0.12 |
| | 7 D RT | 11.78 | 0.02 |
| | 14 D RT | 12.92 | 0.25 |
| | 28 D RT | 15.58 | 0.21 |
| | 1 D HA (70° C.) | 8.44 | 6.28 |
| | 7 D HA (70° C.) | 8.26 | 7.00 |
| | 14 D HA (70° C.) | 7.39 | 4.41 |
| | 28 D HA (70° C.) | 6.44 | 6.39 |
| Conventional PVC | 1 D RT | 4.83 | 9.38 |
| | 7 D RT | 10.16 | 9.02 |

TABLE 2-continued

Peel Adhesion Testing for inventive modified PVC and PVC (regular)

| Membrane | Condition (days/temp. °C.) | Inventive formulation Peel Force (pli) | Conventional Comparative Product-Waterbased adhesive Peel Force (pli) |
|---|---|---|---|
| | 14 D RT | 8.98 | 7.52 |
| | 28 D RT | 7.90 | 10.69 |
| | 1 D HA (70° C.) | 5.76 | 6.58 |
| | 7 D HA (70° C.) | 6.46 | 6.00 |
| | 14 D HA (70° C.) | 6.65 | 6.89 |
| | 28 D HA (70° C.) | 7.72 | 7.58 |

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A method of bonding a sheet membrane to an exterior substrate comprising:
applying an adhesive formulation to at least one of the sheet membrane or the exterior substrate while said adhesive formulation is wet, said adhesive formulation comprising:
a polyurethane dispersion (PUD);
(vinyl acetate/ethylene) copolymer (VAE);
an alkanolamine;
a tackifying resin;
an ether; and
water, wherein the formulation has a pH of from 7.0 to 12.5; and
bringing the sheet membrane and the exterior substrate into contact with said adhesive formulation therebetween during construction outdoors, while said adhesive formulation is wet, to bond simultaneously to the sheet membrane and the exterior substrate upon cure of said adhesive formulation, wherein said adhesive formulation builds strength as the water evaporates thereby facilitating adhesion of the sheet membrane to the exterior substrate, the exterior substrate being steel, wood, concrete, a roof board, insulation, or a fiberglass mat roof board.

2. The method of claim 1 wherein the applying is by roller, brush, or spray.

3. The method of claim 1 wherein the sheet membrane is plain-backed or fleece-backed.

4. The method of claim 1 wherein the applying is to only one of the sheet membrane and the substrate, and the sheet membrane and the substrate are mated together and bonded immediately.

* * * * *